United States Patent
Luo et al.

(10) Patent No.: US 9,258,160 B2
(45) Date of Patent: Feb. 9, 2016

(54) MULTIPLEXING DEMODULATION REFERENCE SIGNALS IN WIRELESS COMMUNICATIONS

(75) Inventors: Xiliang Luo, Northridge, CA (US); Wanshi Chen, San Diego, CA (US); Xiaoxia Zhang, San Diego, CA (US); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 746 days.

(21) Appl. No.: 12/987,771

(22) Filed: Jan. 10, 2011

(65) Prior Publication Data

US 2012/0014318 A1    Jan. 19, 2012

Related U.S. Application Data

(60) Provisional application No. 61/293,991, filed on Jan. 11, 2010.

(51) Int. Cl.
| | |
|---|---|
| *H04W 4/00* | (2009.01) |
| *H04B 7/02* | (2006.01) |
| *H04L 27/26* | (2006.01) |
| *H04L 5/00* | (2006.01) |
| *H04J 13/00* | (2011.01) |

(52) U.S. Cl.
CPC .......... *H04L 27/2613* (2013.01); *H04L 5/0023* (2013.01); *H04J 13/004* (2013.01); *H04J 13/0074* (2013.01)

(58) Field of Classification Search
USPC ........................................................ 370/329
See application file for complete search history.

(56) References Cited

U.S. PATENT DOCUMENTS

| | | |
|---|---|---|
| 2002/0186750 A1 | 12/2002 | Callaway et al. |
| 2008/0165893 A1 | 7/2008 | Malladi et al. |
| 2009/0279493 A1 | 11/2009 | Gaal et al. |
| 2010/0067464 A1 | 3/2010 | Higuchi |

(Continued)

FOREIGN PATENT DOCUMENTS

| | | |
|---|---|---|
| EP | 2056515 A1 | 5/2009 |
| JP | 2008236430 A | 10/2008 |

(Continued)

OTHER PUBLICATIONS

"DM-RS in Support of UL MIMO and TX Diversity", 3GPP TSG-RAN WG1 #59, R1-094870, Nov. 9-13, 2009, Jeju, Korea.

(Continued)

*Primary Examiner* — Kiet Tang
(74) *Attorney, Agent, or Firm* — Liem T. Do

(57) ABSTRACT

Methods and apparatuses are provided for determining cyclic shift (CS) values and/or orthogonal cover codes (OCC) for a plurality of demodulation reference signals (DM-RS) transmitted over multiple layers in multiple-input multiple-output (MIMO) communications. A CS index can be received from a base station in downlink control information (DCI) or similar signaling. Based at least in part on the CS index, CS values for the plurality of DM-RSs can be determined. In addition, OCC can be explicitly signaled or similarly determined from the CS index and/or a configured CS value received from a higher layer. In addition, controlling assignment of CS indices and/or OCC can facilitate providing orthogonality for communications from paired devices in multiuser MIMO.

28 Claims, 11 Drawing Sheets

(56) References Cited

U.S. PATENT DOCUMENTS

| | | | | |
|---|---|---|---|---|
| 2010/0296465 | A1* | 11/2010 | Hooli et al. | 370/329 |
| 2011/0142107 | A1* | 6/2011 | Pan et al. | 375/219 |
| 2012/0176981 | A1* | 7/2012 | Baldemair et al. | 370/329 |

FOREIGN PATENT DOCUMENTS

| | | | |
|---|---|---|---|
| JP | 2012531804 A | 12/2012 | |
| JP | 2013516139 A | 5/2013 | |
| KR | 20090121369 A | 11/2009 | |
| RU | 2309551 C2 | 10/2007 | |
| WO | WO-2005043854 | 5/2005 | |
| WO | 2009120843 A2 | 10/2009 | |
| WO | 2010151092 A2 | 12/2010 | |
| WO | 2011081390 A2 | 7/2011 | |

OTHER PUBLICATIONS

"Views on UL DM-RS", 3GPP TSG RAN WG1 Meeting #59, R1-094508, Jeju, Korea, Nov. 9-13, 2009.

"Performance of uplink MU-MIMO with enhanced demodulation reference signal structure", 3GPP TSG RAN WG1 Meeting #59, R1-094651, Jeju, South Korea, Nov. 9-13, 2009.

"3rd Generation Partnership Project; Technical Specification Group Radio Access Network; Evolved Universal Terrestrial Radio Access (E-UTRA); Physical Channels and Modulation" (Release 8), 3GPP TS 36.211 V8.9.0 (Dec. 2009).

"3rd Generation Partnership Project; Technical Specification Group Radio Access Network; Evolved Universal Terrestrial Radio Access (E-UTRA); Multiplexing and channel coding" (Release 8), 3GPP TS 36.212 V8.8.0 (Dec. 2009).

International Search Report and Written Opinion—PCT/US2011/020895—ISA/EPO—Oct. 5, 2011.

Nortel: "Further discussion UL RS for MU-MIMO", 3GPP Draft; R1-080374 (Nortel-Nortel_UL_MU_MIMO_RS), 3rd Generation Partnership Project (3GPP), Mobile Competence Centre ; 650, Route Deslucioles ; F-06921 Sophia Antipolis Cedex; France, vol. RAN WG1, no. Sevilla, Spain; 20080109, Jan. 9, 2008, XP050108893, [retrieved on Jan. 9, 2008].

Qualcomm Incorporated: "DM-RS in Support of UL Spatial Multiplexing", 3GPP Draft; R1-100691 DMRS for UL MIMO, 3rd Generation Partnership Project (3GPP), Mobile Competence Centre; 650, Route Deslucioles; F-06921 Sophia Antipolis Cedex; France, vol. RAN WG1, no. Valencia, Spain; 20100118, Jan. 12, 2010, XP050418281, [retrieved on Jan. 12, 2010].

ETRI: "Discussion on DM RS for Uplink SU-MIMO in LTE-A", 3GPP TSG-RAN WG1#58b R1-094311,.

Taiwan Search Report—TW100101004—TIPO—Jul. 25, 2013.

LG Electronics: "Consideration on DMRS design for UL SU-MIMO in LTE-A", 3GPP TSG-RAN WG1#57b R1-092514, Jun. 27, 2009, 4 Pages.

Nokia Siemens Networks: "UL DM RS for Multi-bandwidth Multi-user MIMO", 3GPP TSG-RAN WG1 Meeting #51bis R1-080293, Jan. 8, 2008, 3 Pages.

\* cited by examiner

MULTIPLEXING DEMODULATION REFERENCE SIGNALS IN WIRELESS COMMUNICATIONS

CROSS-REFERENCE

The present Application for patent claims priority to Provisional Application No. 61/293,991 entitled "DEMODULATION REFERENCE SIGNAL IN SUPPORT OF UPLINK MULTIPLE-INPUT MULTIPLE-OUTPUT," filed Jan. 11, 2010, and assigned to the assignee hereof and hereby expressly incorporated by reference herein.

BACKGROUND

1. Field

The following description relates generally to wireless network communications, and more particularly to multiplexing demodulation reference signals in wireless communications.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

In addition, a device can transmit demodulation reference signals (DM-RS) to the base station to enable channel estimation of communications received from the device. Moreover, for example, a device can communicate with the base station using single user (SU)-MIMO, which can be supported in LTE for example. In this example, the device can communicate with the base station over multiple layers in similar time/frequency resources. For example, signals can be transmitted by the device over multiple antennas over the same or similar time and frequency resources, such as one or more tones of one or more orthogonal frequency division multiplexing (OFDM) symbols, and received as a sum of the signals at the base station. Thus, for example, the device can transmit DM-RS to the base station for each of the signals to facilitate estimating channels over the same or similar time and frequency resources.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with facilitating deriving cyclic shift (CS) values and/or orthogonal cover codes (OCC) for multiplexing demodulation reference signals (DM-RS) transmitted for multiple layers of device communication. For example, a CS index can be received from a base station (e.g., in downlink control information (DCI) or similar signaling), and CS values and/or OCCs for each of multiple layers can be determined based at least in part on the CS index. Moreover, for example, the CS values and/or OCCs can be determined based additionally in part on a configured CS value received from one or more higher layers of the device. Thus, CS and OCC information need not be signaled by the base station for all of the multiple layers of communication for the device.

According to an example, a method for multiplexing DM-RS in multiple-input multiple-output (MIMO) communications is provided that includes receiving a CS index for transmitting DM-RSs over each of a plurality of layers and determining a CS value and an OCC for transmitting each of the DM-RSs based at least in part on the CS index. The method further includes transmitting the DM-RSs according to the CS value and the OCC.

In another aspect, an apparatus for multiplexing DM-RS in MIMO communications is provided that includes at least one processor configured to obtain a CS index for transmitting DM-RSs over each of a plurality of layers. The at least one processor is further configured to determine a CS value and an OCC for transmitting each of the DM-RSs based at least in part on the CS index and transmit the DM-RSs according to the CS value and the OCC. In addition, the apparatus includes a memory coupled to the at least one processor.

In yet another aspect, an apparatus for multiplexing DM-RS in MIMO communications is provided that includes means for receiving a CS index for transmitting DM-RSs over each of a plurality of layers and means for determining a CS value for transmitting each of the DM-RSs based at least in part on the CS index. The apparatus further includes means for determining an OCC for each of the DM-RSs based at least in part on the CS index and means for transmitting the DM-RSs according to the CS value and the OCC.

Further, in another aspect, a method for multiple-input multiple-output (MIMO) communications is provided which includes transmitting a cyclic shift (CS) index for demodulation reference signals (DM-RSs) and receiving the DM-RSs over a plurality of layers in the MIMO communications. Each of the DM-RSs may be associated with a CS value and an orthogonal cover code (OCC). The CS value and the OCC may be based at least in part on the CS index.

Additionally, in yet another aspect, an apparatus for multiple-input multiple-output (MIMO) communications is provided which includes means for transmitting a cyclic shift (CS) index for demodulation reference signals (DM-RSs) and means for receiving the DM-RSs over a plurality of layers in the MIMO communications. Each of the DM-RSs may be associated with a CS value and an orthogonal cover code (OCC). The CS value and the OCC may be based at least in part on the CS index.

In another aspect, a computer program product for multiple-input multiple-output (MIMO) communications is provided which includes a computer-readable storage medium comprising instructions for causing at least one computer to transmit a cyclic shift (CS) index for demodulation reference signals (DM-RSs), and instructions for causing the at least one computer to receive the DM-RSs over a plurality of layers in the MIMO communications. Each of the DM-RSs is associated with a CS value and an orthogonal cover code (OCC). The CS value and the OCC are based at least in part on the CS index.

Still, in another aspect, a computer-program product is provided for multiplexing DM-RS in MIMO communications including a computer-readable medium having instructions for causing at least one computer to obtain a CS index for transmitting DM-RSs over each of a plurality of layers. The computer-readable medium further includes instructions for causing the at least one computer to determine a CS value and an OCC for transmitting each of the DM-RSs based at least in part on the CS index and instructions for causing the at least one computer to transmit the DM-RSs according to the CS value and the OCC.

According to another example, a method for provisioning CS indices or OCC to devices in multiuser MIMO (MU-MIMO) communications is provided that includes selecting a first CS index or a first OCC for a first device and a second CS index or a second OCC for a second device paired with the first device in MU-MIMO communications. The method further includes signaling the first CS index or an index of the first OCC to the first device and signaling the second CS index or an index of the second OCC to the second device.

In another aspect, an apparatus for provisioning CS indices or OCC to devices in MU-MIMO communications is provided that includes at least one processor configured to determine a first CS index or a first OCC for a first device and a second CS index or a second OCC for a second device paired with the first device in MU-MIMO communications and transmit the first CS index or an index of the first OCC to the first device. The at least one processor is further configured to transmit the second CS index or an index of the second OCC to the second device. In addition, the apparatus includes a memory coupled to the at least one processor.

In yet another aspect, an apparatus for provisioning CS indices or OCC to devices in MU-MIMO communications is provided that includes means for selecting a first CS index for a first device and a second CS index for a second device paired with the device in MU-MIMO communications and means for selecting a first OCC for the first device and a second OCC for the second device. The apparatus further includes means for signaling the first CS index or an index of the first OCC to the first device and signaling the second CS index or an index of the second OCC to the second device.

Still, in another aspect, a computer-program product is provided for provisioning CS indices or OCC to devices in MU-MIMO communications including a computer-readable medium having instructions for causing at least one computer to determine a first CS index or a first OCC for a first device and a second CS index or a second OCC for a second device paired with the first device in MU-MIMO communications. The computer-readable medium further includes instructions for causing the at least one computer to transmit the first CS index or an index of the first OCC to the first device and instructions for causing the at least one computer to transmit the second CS index or an index of the second OCC to the second device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
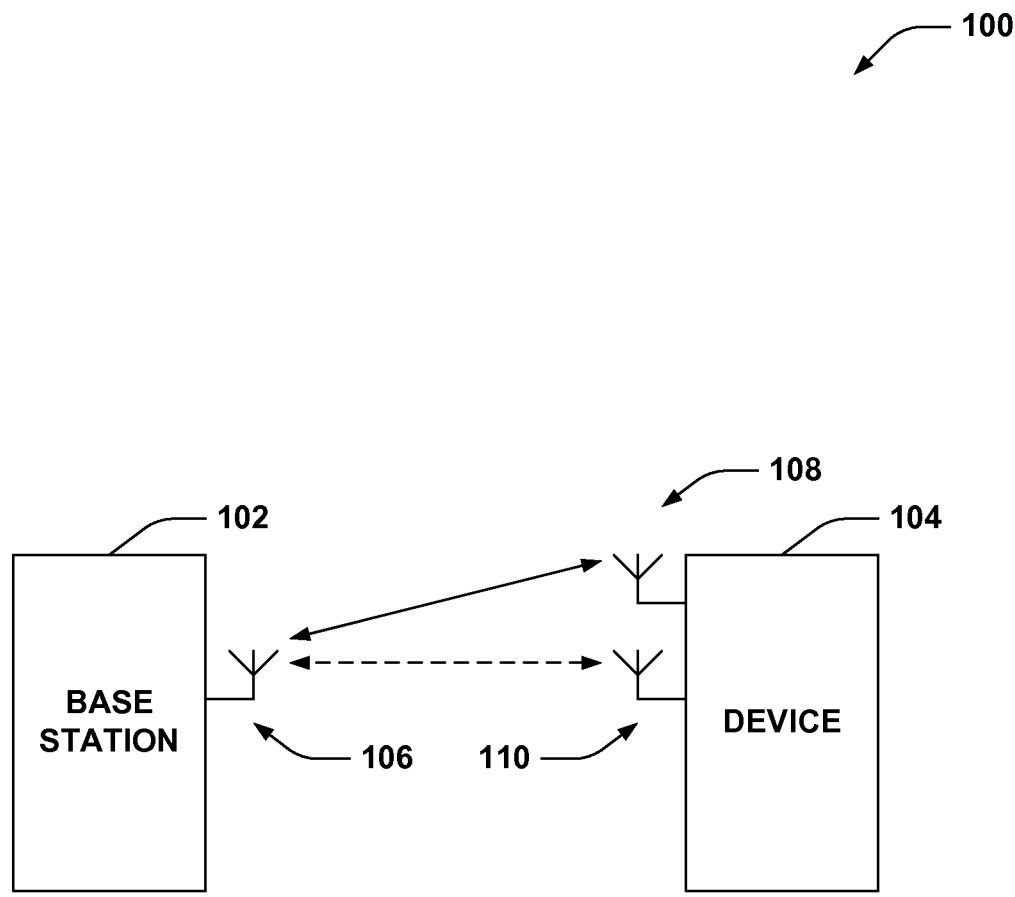
FIG. 1 illustrates an example system for communicating using multiple layers in multiple-input multiple-output (MIMO).

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, cyclic shift (CS) values and/or orthogonal cover codes (OCC) can be derived by a device based at least in part on a signaled CS index. For example, the device can communicate with a base station using multiple-input multiple-output (MIMO) (e.g., single-user MIMO (SU-MIMO), multiuser MIMO (MU-MIMO), etc.), and can thus transmit demodulation reference signals (DM-RS) for each layer corresponding to MIMO communications. The device can receive the signaled CS index and derive a CS value and/or OCC for each layer based at least in part on the signaled CS index, another configured CS value, and/or the like. Moreover, for example, the OCC or a related index can additionally or alternatively be explicitly signaled to the device. In either case, the CS values for the multiple layers and/or the OCCs can be derived from a single received CS index, which conserves signaling resources. In addition, orthogonality can be maintained for paired devices in MU-MIMO even where the devices have differing transmission bandwidths by selecting certain CS indices and/or OCCs for the devices.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a node, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, illustrated is a wireless communication system 100 that facilitates communicating over multiple channels. System 100 includes a base station 102 that communicates with a device 104 to provide access to a wireless network. Base station 102 and device 104 can communicate over multiple antennas as depicted. For example, base station 102 can include antenna 106 and/or one or more additional antennas (not shown), and device 104 can include at least antennas 108 and 110 (and/or additional antennas) for communicating over multiple layers using MIMO. Base station 102 can be a macrocell, femtocell, picocell, or similar base station, a relay node, a mobile base station, a device communicating in peer-to-peer or ad-hoc mode, a portion thereof and/or the like. Device 104 can be a UE, modem (or other tethered device), a portion thereof, and/or the like.

According to an example, device 104 can transmit uplink signals to base station 102 using both antennas 108 and 110, which can be physical or virtual antennas. Using both antennas 108 and 110 (and/or additional antennas) allows device 104 to communicate with base station 102 using MIMO. Thus, device 104 communicates with base station 102 over multiple layers that each correspond to the antenna 108 and/or 110. Each layer, for example, can correspond to the same time and frequency resources in MIMO, and device 104 can spatially multiplex signals for each layer over the time and frequency resources to provide some separation for receiving the signals. In this regard, base station 102 can receive a sum of signals simultaneously transmitted from the antennas 108 and 110 over frequency resources in a given time period and can differentiate the signals based at least in part on demultiplexing the signals. This, for example, can allow for increased throughput of device 104 by allowing transmission of multiple signals without using additional time and frequency resources. Device 104 can transmit a DM-RS for each layer, which the base station 102 can receive and utilize to estimate a channel for each of the signals.

To provide improved orthogonality among the layers for DM-RS transmission, device 104 can use CS separation as a primary multiplexing scheme, and/or OCC separation as a complementary multiplexing scheme. Thus, for example, each layer's DM-RS can have a distinct associated CS value and/or an OCC. CS can refer to cyclically shifting the DM-RS in time domain. For example, for CS value of $n_{cs}$, the corresponding transmitted DM-RS signal sequence in time domain can be expressed as: $r(mod(n-Mn_{cs},12M))$, where M can be the length of the DM-RS sequence expressed in multiples of 12, and n can represent a time index from 0 to 12M−1; also, the transmitted signal in frequency domain can be expressed as $R(k)e^{j2\pi n_{cs}/12k}$, where $R(k)=DFT\{r(n)\}$ is a common base sequence for performing CS at different layers, and k can be a tone index from 0 to 12M−1. A subframe, for example, can refer to a collection of time and frequency resources, and can include one or more symbols, which are each a subset of at least the time resources, and a slot can be a time portion of the subframe comprising a set of the one or more symbols. For example, in LTE, a symbol can correspond to an orthogonal frequency division multiplexing (OFDM) symbol, which can include a portion of frequency (e.g., a collection of carriers in a frequency band) over a 1 millisecond time period. A subframe for uplink communications in LTE, for example, can comprise two slots each including of a collection of 6 or 7 OFDM symbols, depending on a cyclic prefix (CP).

In an example, device 104 can derive a CS value and/or OCC for the DM-RSs corresponding to each of the multiple layers based at least in part on a received CS index. For example, the CS index can be received as part of downlink control information (DCI) from base station 102 (e.g., in a control channel, such as physical downlink control channel (PDCCH) in LTE). Thus, base station 102 need not signal, and device 104 need not receive, CS values and/or OCC for each of the DM-RSs, which can conserve time and signaling resources by reducing overhead required for such signaling. Similarly, as described, device 104 can derive the CS values further based at least in part on a configured CS value received from higher layers at device 104. Moreover, in an example, base station 102 can explicitly signal OCC and/or device 104 can also derive the OCC for each layer based at least in part on the CS index and/or the configured CS value. In one example, device 104 can derive the CS values based at least in part on a pre-defined rule associated with the CS index (and/or the configured CS value) and/or a number of antennas at device 104. In a specific example, device 104 can assign the CS index received in DCI and/or a CS value computed as a function of the CS index and configured CS value to antenna 108 for transmitting DM-RS, which is denoted as $n_{cs}$ above. Then the device 104 can assign the CS value: $n_{cs}+6$ to antenna 110 for transmitting DM-RS to provide maximum CS separation (e.g., since up to 12 different CSs can be utilized in LTE).

Figure 2:
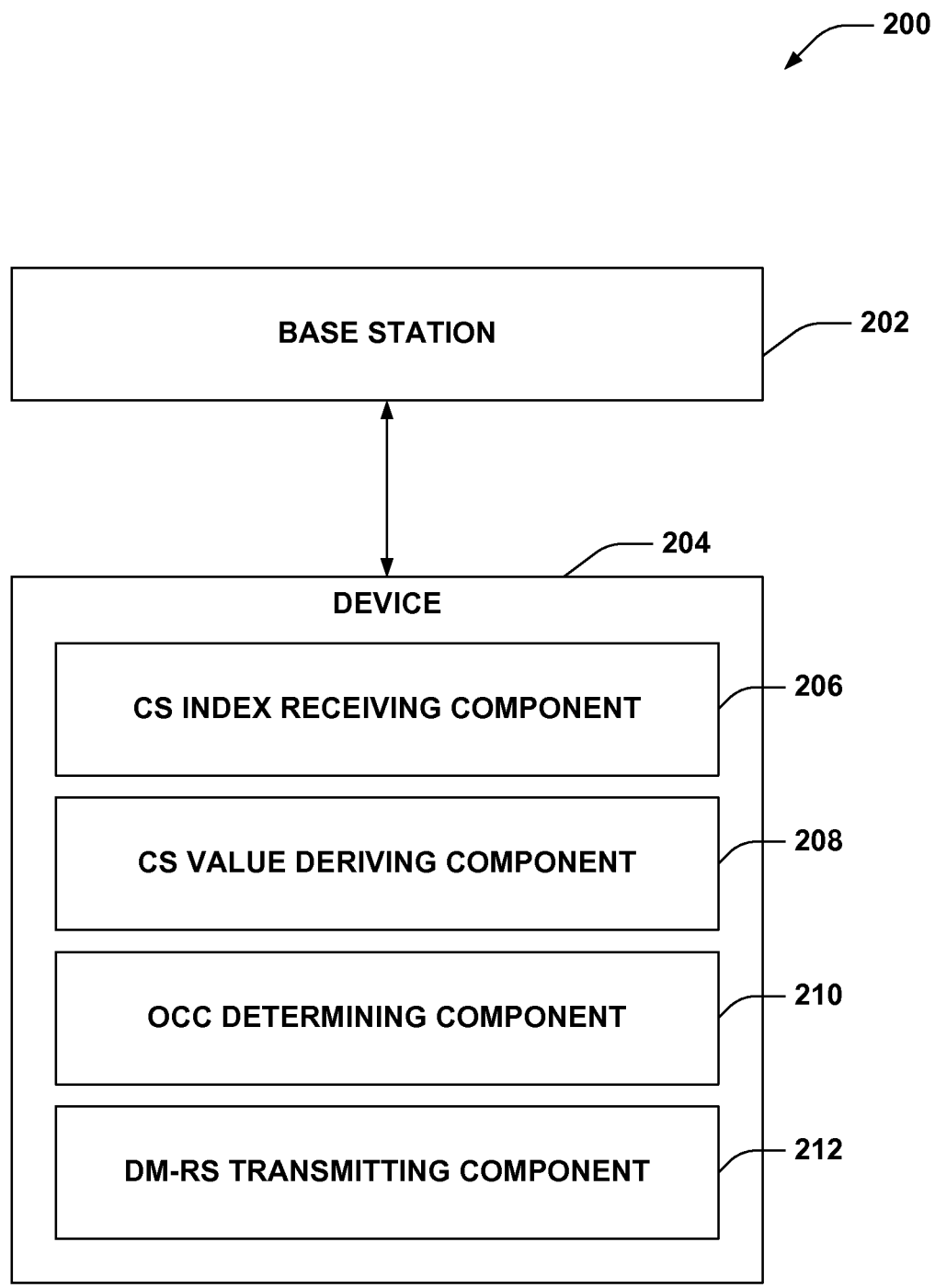
FIG. 2 illustrates an example system for transmitting demodulation reference signals (DM-RS) for multiple layers in MIMO.

Turning to FIG. 2, an example wireless communication system 200 is illustrated that facilitates deriving CS values and/or OCC for transmitting DM-RS for multiple layers in MIMO communications. System 200 includes a base station 202 that wirelessly communicates with a device 204 (e.g., to provide wireless network access thereto). Base station 202 can be a macrocell, femtocell, picocell, or similar base station, a relay node, mobile base station, device in peer-to-peer or ad-hoc mode, a portion thereof, etc., and device 204 can be a UE, modem, a portion thereof, etc. Moreover, device 204 can comprise a CS index receiving component 206 for obtaining a CS index from a base station for transmitting a DM-RS, and a CS value deriving component 208 for determining a CS value for one or more DM-RSs related to one or more MIMO communication layers at device 204. Device 204 may also comprise an OCC determining component 210 for receiving an OCC related to the one or more DM-RSs, and a DM-RS transmitting component 212 for transmitting the DM-RSs using the respective CS values and/or OCC.

According to an example, base station 202 can signal a CS index for transmitting a DM-RS to device 204 in DCI over a control channel. In this example, CS value deriving component 208 can compute CS values for DM-RSs related to multiple layers of the device 204 based at least in part on the CS index. In one example, CS value deriving component 208 can compute the CS values for the DM-RSs further based at least in part on the number of layers or corresponding physical or virtual antennas in MIMO. In this regard, in one example, CS value deriving component 208 can compute the CS values to provide maximal separation for the DM-RSs. For example, CS value deriving component 208 can compute the CS values according to a pre-defined rule for the number of layers and/or corresponding antennas. In addition, for example, OCC determining component 210 can obtain an OCC index in the DCI or otherwise derive the OCC index from the signaled CS index. In one example, the OCC index can correspond to length-2 OCC according to the following table.

| OCC Index | OCC |
|---|---|
| 0 | [+1, +1] |
| 1 | [+1, −1] | where the OCC is applied to the DM-RS signals across the two slots in the subframe. In addition, as described, CS value deriving component 208 can further obtain a configured CS value from higher layers (e.g., a radio resource control (RRC), application, or similar layer) and can derive the CS value and/or OCC further based at least in part on the configured CS value. In this regard, DM-RS transmitting component 212 can transmit DM-RSs for each of the plurality of layers according to the derived CS values and/or OCCs (e.g., by applying the OCCs to the respective DM-RSs and transmitting the DM-RSs with respective CS values).

In one specific example, in LTE up to 12 different CS indices can be utilized. In the examples below, the former case is shown for the purpose of illustration. In this example, CS index receiving component 206 can obtain the CS index in the DCI, and CS value deriving component 208 can determine CS values for each layer of device 204 based at least in part on the CS index and the number of layers. For example, CS value deriving component 208 selects CS values that maximize separation across the layers. In addition, OCC determining component 210 can determine the OCC index for each layer based at least in part on the CS index and/or another configured CS value received from a higher layer. For example, OCC determining component 210 can sum the CS index dynamically signaled in the corresponding UL grant and the higher layer configured CS value (e.g., modulo 12 or otherwise) to determine a CS value for which to select the OCC. In this example, the OCC determining component 210 can select the OCC based at least in part on a pre-defined table, such as the following.

| | CS Value | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| OCC Index | 0 | 1 | 0 | 1 | 0 | 1 | 1 | 0 | 1 | 0 | 1 | 0 |

It is to be appreciated that the OCC determining component 210 can determine the OCC index based at least in part on substantially any function of the received CS index, the configured CS value from the higher layer, the computed CS value, a mapping of CS indices or values to OCC indices or actual OCCs, and/or the like.

In this example using LTE, the CS index received by CS index receiving component 206 in DCI can be 3-bits, which is not alone enough to express the 12 possibilities for CS value; in one example, the 3-bit value can express the CS values shown in bold in the above table (e.g., 0, 2, 3, 4, 6, 8, 9, and 10). Thus, CS value deriving component 208 can receive the configured CS value from the higher layer, which OCC determining component 210 can use in conjunction with the CS index received in DCI to compute the CS value for determining the OCC index, which can allow for inclusion of values 1, 5, 7, and 11 above as well. In another example, it is to be appreciated that OCC determining component 210 can derive the OCC index based at least in part on substantially any signaled value or mapping thereto, such as a resource assignment dictated by the DCI (e.g., starting and/or ending index of the physical resource block), alone or in combination with other values, such as the signaled CS index, etc.

In one example, CS value deriving component 208 can utilize one or more of the following pre-defined rules in determining the CS value, and/or OCC determining component 210 can utilize the rules for selecting an OCC, for each layer (e.g., physical or virtual antenna) in MIMO communications, where $n_{DMRS}^{(2)}$ can represent the CS index received by CS index receiving component 206 which is signaled in the DCI—e.g. the UL grant.

Rank-1 Transmission (e.g., for Transmissions Using 1 Antenna)

| Physical/ Virtual Antenna | DM-RS in Slot 0 & 1 |
|---|---|
| 0 | CS: $n_{DMRS}^{(2)}$, OCC Index: $I_{OCC}$ |

Rank-2 Transmission (e.g., for Transmissions Using 2 Antennas)

| Physical/ Virtual Antenna | DM-RS in Slot 0 & 1 Option A: Distinct OCC | DM-RS in Slot 0 & 1 Option B: Same OCC |
|---|---|---|
| 0 | CS: $n_{DMRS}^{(2)}$, OCC Index: $I_{OCC}$ | CS: $n_{DMRS}^{(2)}$, OCC Index: $I_{OCC}$ |
| 1 | CS: $n_{DMRS}^{(2)} + 6$, OCC Index: $1-I_{OCC}$ | CS: $n_{DMRS}^{(2)} + 6$, OCC Index: $I_{OCC}$ |

Rank-3 Transmission (e.g., for Transmissions Using 3 Antennas)

Alternative 1: Non-Uniform CS Separation Across DM-RS Transmissions

| Physical/ Virtual Antenna | DM-RS in Slot 0 & 1 Option A: Distinct OCC | DM-RS in Slot 0 & 1 Option B: Same OCC |
|---|---|---|
| 0 | CS: $n_{DMRS}^{(2)}$, OCC Index: $I_{OCC}$ | CS: $n_{DMRS}^{(2)}$, OCC Index: $I_{OCC}$ |
| 1 | CS: $n_{DMRS}^{(2)} + 3$, OCC Index: $1-I_{OCC}$ | CS: $n_{DMRS}^{(2)} + 3$, OCC Index: $I_{OCC}$ |
| 2 | CS: $n_{DMRS}^{(2)} + 6$, OCC Index: $I_{OCC}$ | CS: $n_{DMRS}^{(2)} + 6$, OCC Index: $I_{OCC}$ |

Alternative 2: Uniform CS Separation Across DM-RS Transmissions

| Physical/ Virtual Antenna | DM-RS in Slot 0 & 1 Option A: Distinct OCC | DM-RS in Slot 0 & 1 Option B: Same OCC |
|---|---|---|
| 0 | CS: $n_{DMRS}^{(2)}$, OCC Index: $I_{OCC}$ | CS: $n_{DMRS}^{(2)}$, OCC Index: $I_{OCC}$ |
| 1 | CS: $n_{DMRS}^{(2)} + 4$, OCC Index: $1-I_{OCC}$ | CS: $n_{DMRS}^{(2)} + 4$, OCC Index: $I_{OCC}$ |
| 2 | CS: $n_{DMRS}^{(2)} + 8$, OCC Index: $I_{OCC}$ | CS: $n_{DMRS}^{(2)} + 8$, OCC Index: $I_{OCC}$ |

Rank-4 Transmission (e.g., for Transmissions Using 4 Antennas)

| Physical/ Virtual Antenna | DM-RS in Slot 0 & 1 Option A: Distinct OCC | DM-RS in Slot 0 & 1 Option B: Same OCC |
|---|---|---|
| 0 | CS: $n_{DMRS}^{(2)}$, OCC Index: $I_{OCC}$ | CS: $n_{DMRS}^{(2)}$, OCC Index: $I_{OCC}$ |
| 1 | CS: $n_{DMRS}^{(2)} + 3$, OCC Index: $1-I_{OCC}$ | CS: $n_{DMRS}^{(2)} + 3$, OCC Index: $I_{OCC}$ |
| 2 | CS: $n_{DMRS}^{(2)} + 6$, OCC Index: $I_{OCC}$ | CS: $n_{DMRS}^{(2)} + 6$, OCC Index: $I_{OCC}$ |
| 3 | CS: $n_{DMRS}^{(2)} + 9$, OCC Index: $1-I_{OCC}$ | CS: $n_{DMRS}^{(2)} + 9$, OCC Index: $I_{OCC}$ |

In this example, OCC determining component 210 can determine $I_{OCC}$, the OCC index, explicitly from a DCI value, implicitly based on the CS index (or other DCI value) and a corresponding pre-defined table (as shown above, in one example), and/or the like. In addition, it is to be appreciated that the summations shown above can be modulo 12 so that the CS value is between 0 and 11. For example, for physical/virtual antennas in Rank-4 Transmission, CS value deriving component 208 can respectively compute the CS values as $n_{DMRS}^{(2)}$, $(n_{DMRS}^{(2)}+3)\mod 12$, $(n_{DMRS}^{(2)}+6)\mod 12$, and $(n_{DMRS}^{(2)}+9)\mod 12$.

Moreover, using Option A for distinct OCC as shown above allows for further separation of the DM-RSs for each layer, which can provide better throughput performance for device 204. Thus, Option A is optimized for SU-MIMO transmissions. In fact, devices that use different OCCs can also be paired together while preserving orthogonal DM-RSs regardless of CS value. For example, the base station 202 can implicitly or explicitly signal $I_{OCC}$ to the device 204 and $1-I_{OCC}$ to the other device, as described in further detail below. In either case, orthogonality can be maintained for DM-RSs related to the device 204 and the other device regardless of transmission bandwidth.

Figure 3:
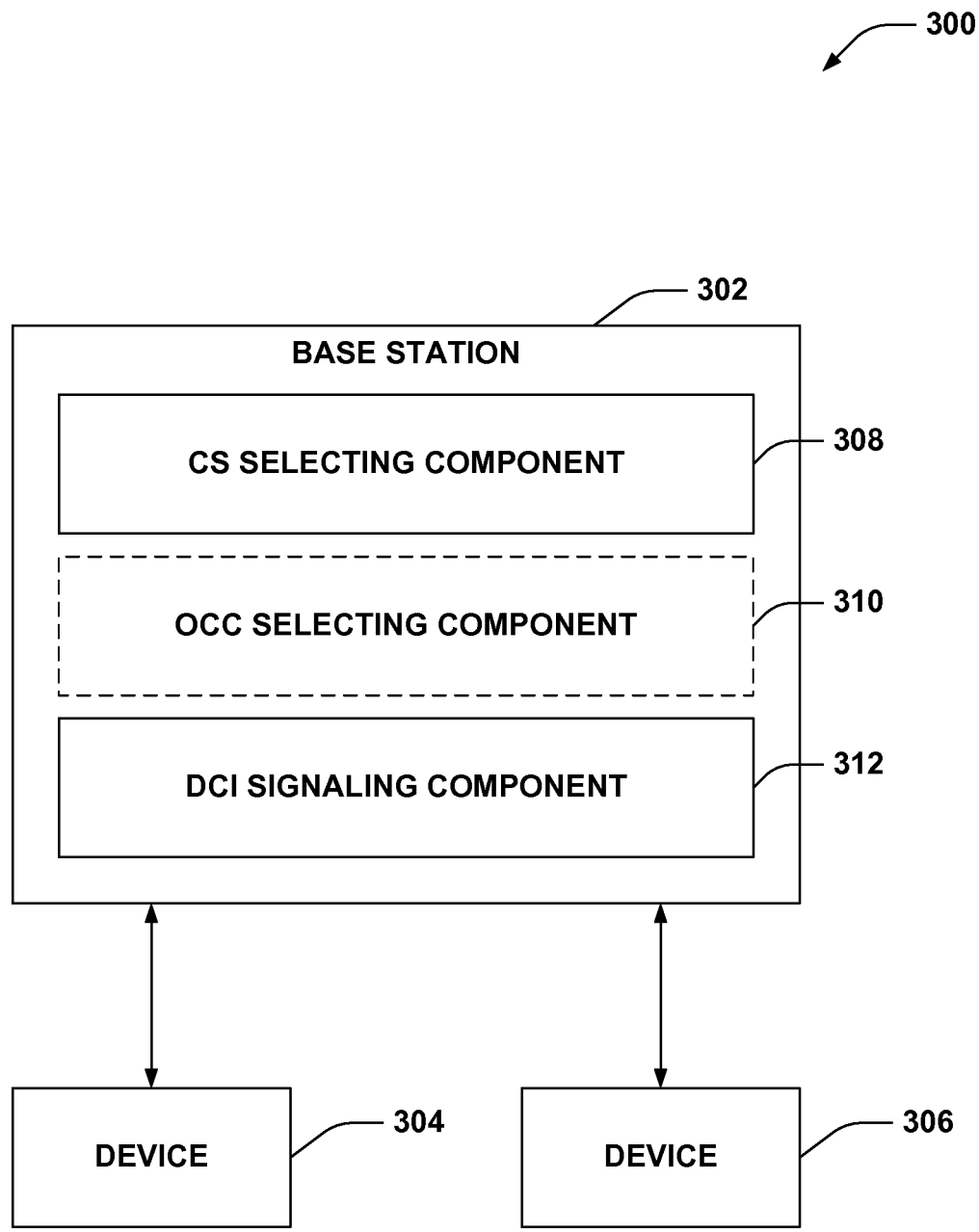
FIG. 3 illustrates an example system for provisioning cyclic shift (CS) indices or orthogonal cover codes (OCC) to one or more devices in multiuser MIMO (MU-MIMO).

Referring to FIG. 3, illustrated is an example wireless communication system 300 that facilitates selecting OCCs for devices in MU-MIMO. System 300 includes a base station 302 that wirelessly communicates with devices 304 and 306 (e.g., to provide wireless network access thereto). As described, base station 302 can be a macrocell, femtocell, picocell, or similar base station, a relay node, mobile base station, device in peer-to-peer or ad-hoc mode, a portion thereof, etc., and devices 304 and 306 can be a UE, modem, a portion thereof, etc. Base station 302 can include a CS selecting component 308 that determines CS indices for one or more devices, an optional OCC selecting component 310 that determines OCCs for one or more devices, and a DCI signaling component 312 that signals DCI to the one or more devices.

According to an example, base station 302 can pair devices 304 and 306 for communications in MU-MIMO, providing similar time and frequency resources thereto. Thus, in one example, CS selecting component 308 can determine different CS indices for device 304 and device 306 to avoid collision where device 304 and device 306 have different transmission bandwidths. In another example, OCC selecting component 310 can determine to provide an OCC index to device 304 for applying an OCC to DM-RSs transmitted by device 304 and can determine to provide a different OCC index to device 306 (e.g., $1-I_{OCC}$, where OCC selecting component 310 assigns $I_{OCC}$ to device 304, as described above). In either case, DCI signaling component 312 can communicate the respective CS indices and/or OCC indices to device 304 and device 306 in DCI over a control channel. Thus, for example, devices 304 and 306 can derive the CS values and OCCs for various communication layers, as described above, based at least in part on the signaled values. Because devices 304 and 306 utilize different CSs and/or different OCC for transmitting DM-RSs, orthogonality can be maintained for the DM-RSs. In one example, under Option B above, CS selecting component 308 determines similar CS indices and OCC selecting component 310 determines different OCCs for devices 304 and 306.

Figure 4:
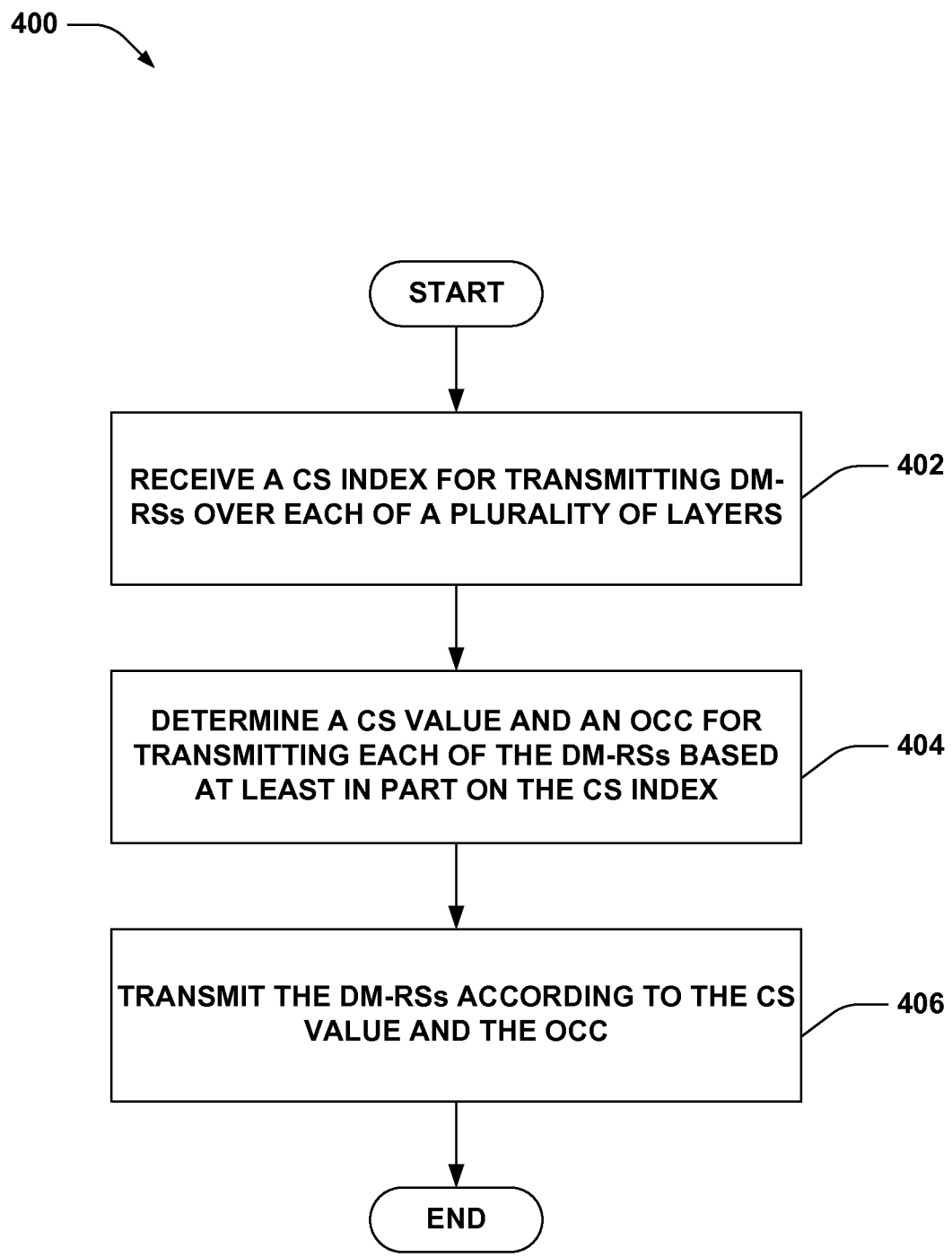
FIG. 4 illustrates an example methodology for determining CS values or OCC for multiple DM-RSs in MIMO.
Figure 5:
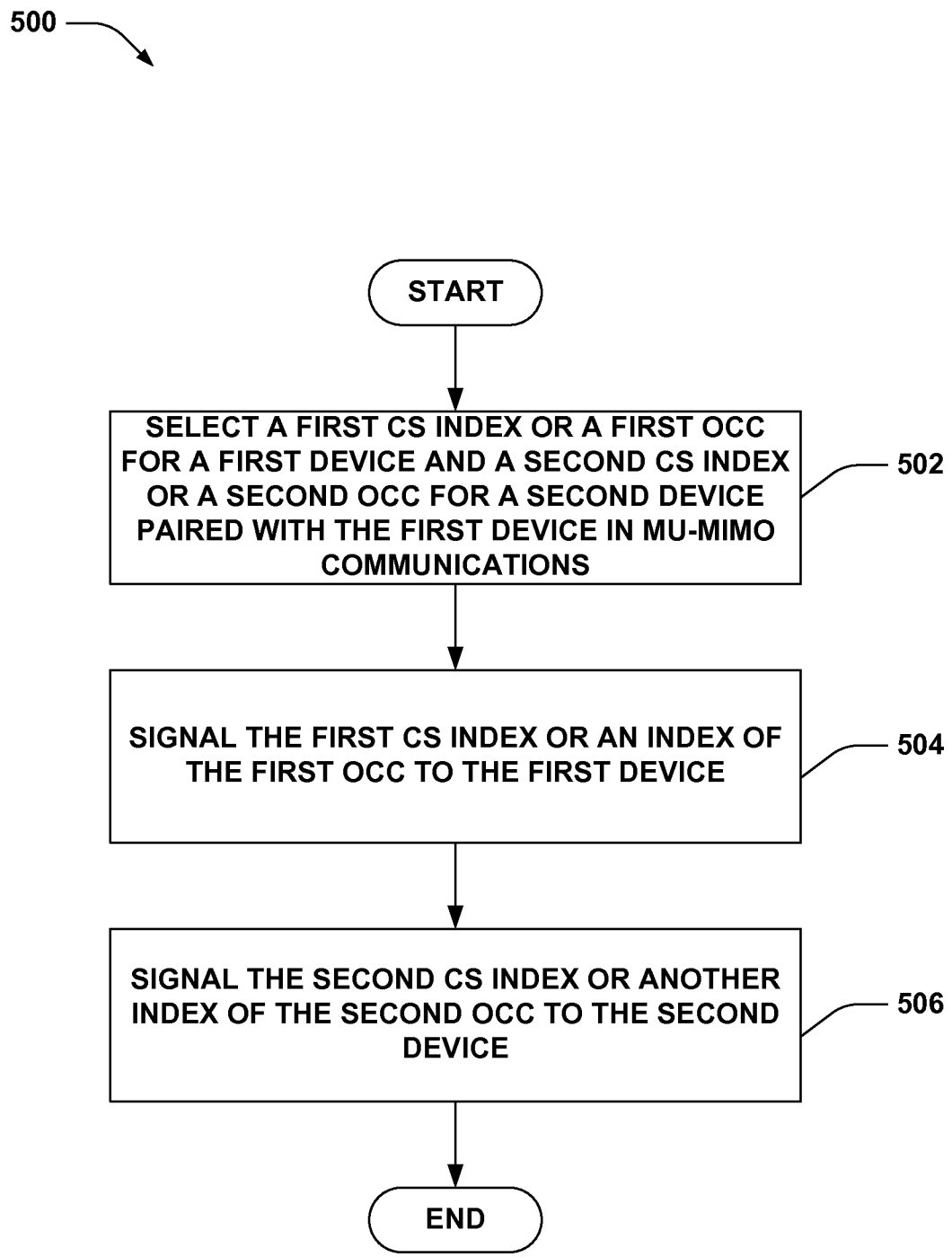
FIG. 5 illustrates an example methodology for signaling CS indices and/or OCC to maintain orthogonality in MU-MIMO.

Referring to FIGS. 4-5, example methodologies relating to determining CS values and/or OCC for transmitting DM-RS in MIMO communications are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Referring to FIG. 4, an example methodology 400 is depicted for determining a CS value and OCC for DM-RS transmission over multiple communication layers. At 402, a CS index for transmitting DM-RSs over each of a plurality of different layers can be received. As described, this can be received in a DCI from a base station, and the different layers can be related to physical or virtual antennas used for MIMO communications, such that a DM-RS can be transmitted for each layer. At 404, a CS value and an OCC can be determined for transmitting each of the DM-RSs based at least in part on the CS index. For example, the CS value can be determined based on a pre-defined rule and/or further based on the number of layers, as described. The rule can maximize separation of the DM-RSs, as described, based on the CS index and number of layers. In addition, the OCC can further be determined based at least in part on a configured CS value received from a higher layer (e.g., an RRC layer, application layer, and/or the like). At 406, the DM-RSs can be transmitted according to the cyclic shift and the OCC.

Turning to FIG. 5, an example methodology 500 is depicted for signaling OCCs to paired devices in MU-MIMO communications is illustrated. At 502, a first CS index or a first OCC can be selected for a first device and a second CS index or a second OCC can be selected for a second device paired with the first device in MU-MIMO communications. The first OCC may be different from the second OCC. As described, the first OCC and second OCC can each be one of two possible OCCs. At 504, the first CS index or an index of the first OCC can be signaled to the first device, and at 506, the second CS index or an index of the second OCC can be signaled to the second device. As described, this can include signaling the first CS index or first OCC and the second CS index or second OCC in DCIs to the first device and second device, respectively. In this regard, the first device and second device can maintain orthogonality for transmitting DM-RSs, as described.

It will be appreciated that, in accordance with one or more aspects described herein, inferences can be made regarding determining CS values or OCC for transmitting DM-RSs in MIMO communications, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 6:
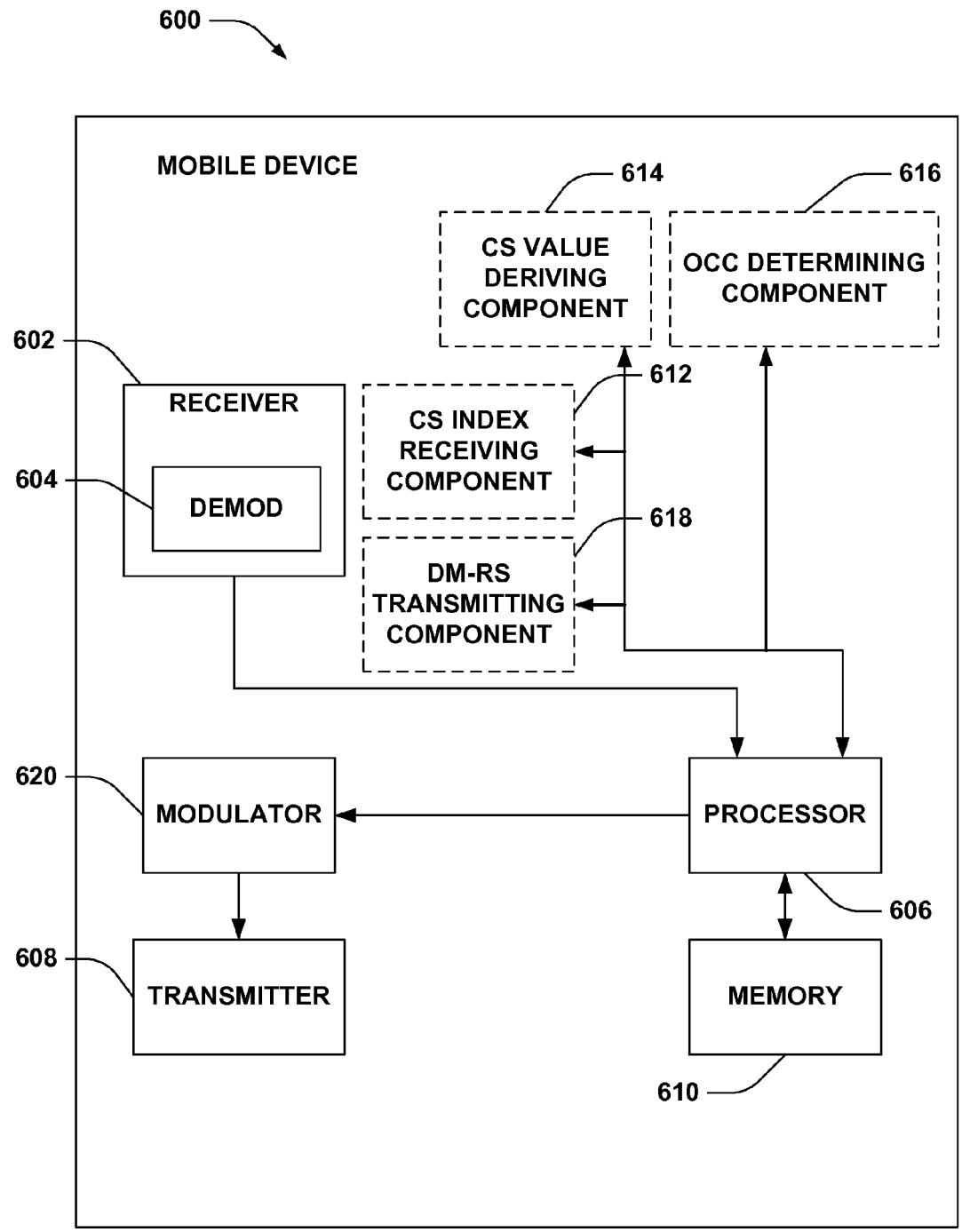
FIG. 6 illustrates an example mobile device for determining CS values and/or OCC for transmitting multiple DM-RSs.

FIG. 6 is an illustration of a mobile device 600 that facilitates transmitting DM-RSs for multiple layers in MIMO communications. Mobile device 600 comprises a receiver 602 that receives a signal via, for instance, a receive antenna (not shown), performs typical actions on (e.g., filters, amplifies, downconverts, etc.) the received signal, and digitizes the conditioned signal to obtain samples. Receiver 602 can comprise a demodulator 604 that can demodulate received symbols and provide them to a processor 606 for channel estimation. Processor 606 can be a processor dedicated to analyzing information received by receiver 602 and/or generating information for transmission by a transmitter 608, a processor that controls one or more components of mobile device 600, and/or a processor that both analyzes information received by receiver 602, generates information for transmission by transmitter 608, and controls one or more components of mobile device 600.

Mobile device 600 can additionally comprise memory 610 that is operatively coupled to processor 606 and that can store data to be transmitted, received data, information related to available channels, data associated with analyzed signal and/or interference strength, information related to an assigned channel, power, rate, or the like, and any other suitable information for estimating a channel and communicating via the channel. Memory 610 can additionally store protocols and/or algorithms associated with estimating and/or utilizing a channel (e.g., performance based, capacity based, etc.).

It will be appreciated that the data store (e.g., memory 610) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 610 of the subject systems and methods is intended to comprise, without being limited to, these and any other suitable types of memory.

Processor 606 can further be optionally operatively coupled to a CS index receiving component 612, which can be similar to CS index receiving component 206, and a CS value deriving component 614, which can be similar to CS value deriving component 208. Processor 606 can also be optionally operatively coupled to an OCC determining component 616, which can be similar to OCC determining component 210, and a DM-RS transmitting component 618, which can be similar to DM-RS transmitting component 212. Mobile device 600 still further comprises a modulator 620 that modulate signals for transmission by transmitter 608 to, for instance, a base station, another mobile device, etc. Although depicted as being separate from the processor 606, it is to be appreciated that the CS index receiving component 612, CS value deriving component 614, OCC determining component 616, DM-RS transmitting component 618, demodulator 604, and/or modulator 620 can be part of the processor 606 or multiple processors (not shown). In addition, for example, DM-RS transmitting component 618 can utilize modulator 620 in applying an OCC to the DM-RSs.

Figure 7:
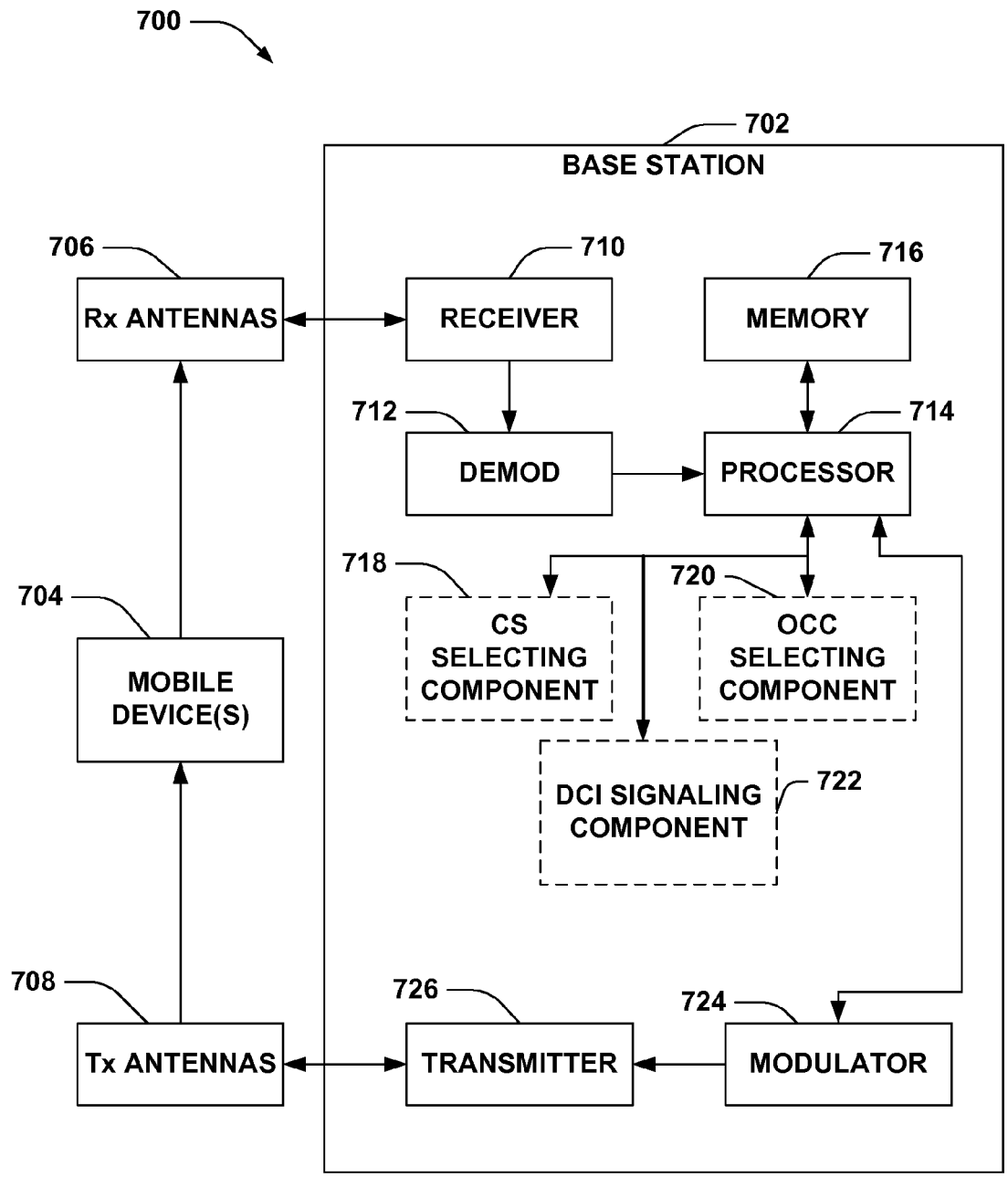
FIG. 7 illustrates an example system for providing CS indices or OCCs to one or more devices in MU-MIMO.

FIG. 7 is an illustration of a system 700 that facilitates signaling a CS index or OCC index to one or more devices in MU-MIMO communications. System 700 comprises a base station 702, which can be substantially any base station (e.g., a small base station, such as a femtocell, picocell, etc., relay node, mobile base station . . . ) having a receiver 710 that receives signal(s) from one or more mobile devices 704 through a plurality of receive antennas 706 (e.g., which can be of multiple network technologies, as described), and a transmitter 726 that transmits to the one or more mobile devices 704 through a plurality of transmit antennas 708 (e.g., which can be of multiple network technologies, as described). In addition, in one example, transmitter 726 can transmit to the mobile devices 704 over a wired front link. Receiver 710 can receive information from one or more receive antennas 706 and is operatively associated with a demodulator 712 that demodulates received information. In addition, in an example, receiver 710 can receive from a wired backhaul link. Demodulated symbols are analyzed by a processor 714 that can be similar to the processor described above with regard to FIG. 6, and which is coupled to a memory 716 that stores information related to estimating a signal (e.g., pilot) strength and/or interference strength, data to be transmitted to or received from mobile device(s) 704 (or a disparate base station (not shown)), and/or any other suitable information related to performing the various actions and functions set forth herein.

Processor 714 is further optionally coupled to a CS selecting component 718, which can be similar to CS selecting component 308, an OCC selecting component 720, which can be similar to an OCC selecting component 310, and a DCI signaling component 722, which can be similar to DCI signaling component 312. Moreover, for example, processor 714 can modulate signals to be transmitted using modulator 724, and transmit modulated signals using transmitter 726. Transmitter 726 can transmit signals to mobile devices 704 over Tx antennas 708. Furthermore, although depicted as being separate from the processor 714, it is to be appreciated that the CS selecting component 718, OCC selecting component 720, DCI signaling component 722, demodulator 712, and/or modulator 724 can be part of the processor 714 or multiple processors (not shown).

Figure 8:
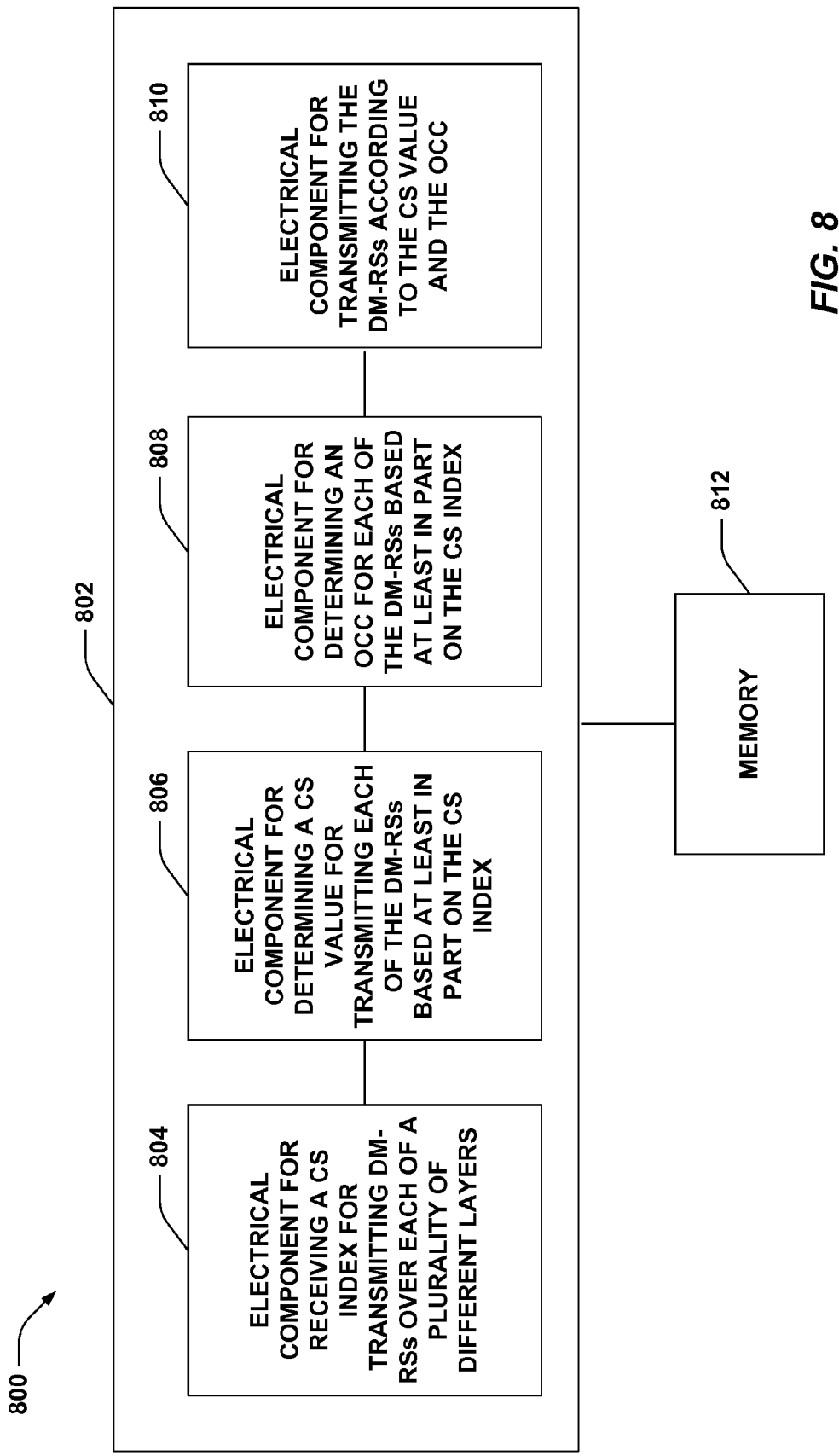
FIG. 8 illustrates an example system for determining CS values or OCC for multiple DM-RSs in MIMO.

With reference to FIG. 8, illustrated is a system 800 that transmits DM-RSs for multiple communication layers. For example, system 800 can reside at least partially within a base station, mobile device, etc. It is to be appreciated that system 800 is represented as including functional blocks, which can be functional blocks that represent functions implemented by a processor, software, or combination thereof (e.g., firmware). System 800 includes a logical grouping 802 of electrical components that can act in conjunction. For instance, logical grouping 802 can include an electrical component for receiving a CS index for transmitting DM-RSs over each of a plurality of different layers 804. For example, the CS index can be received in DCI and can relate to transmitting one DM-RS. Further, logical grouping 802 can comprise an electrical component for determining a CS value for transmitting each of the DM-RSs based at least in part on the CS index 806. For example, as described, electrical component 806 can compute CS values for transmitting the various DM-RSs based on the CS index.

In addition, logical grouping 802 can comprise an electrical component for determining an OCC for each of the DM-RSs based at least in part on the CS index 808. Moreover, as described, the electrical component 808 can further determine the OCC based at least in part on a configured CS value received from a higher layer. Furthermore, logical grouping 802 can comprise an electrical component for transmitting the DM-RSs according to the CS value and the OCC 810. As described above, for example, electrical component 810 can apply the OCC to the DM-RS and can transmit the DM-RS over an OFDM symbol with an index corresponding to the derived CS value for the DM-RS.

For example, electrical component 804 can include a CS index receiving component 206. In addition, for example, electrical component 806, in an aspect, can include a CS value deriving component 208. Also, for example, electrical component 808, in an aspect, can include an OCC determining component 210. Moreover, electrical component 810, in an aspect, can include a DM-RS transmitting component 212. Additionally, system 800 can include a memory 812 that retains instructions for executing functions associated with the electrical components 804, 806, 808 and 810. While shown as being external to memory 812, it is to be understood that one or more of the electrical components 804, 806, 808, and 810 can exist within memory 812.

In one example, electrical components 804, 806, 808, and 810 can comprise at least one processor, or each electrical component 804, 806, 808, and 810 can be a corresponding module of at least one processor. Moreover, in an additional or alternative example, electrical components 804, 806, 808, and 810 can be a computer program product comprising a computer readable medium, where each electrical component 804, 806, 808, and 810 can be corresponding instructions and/or code.

Figure 9:
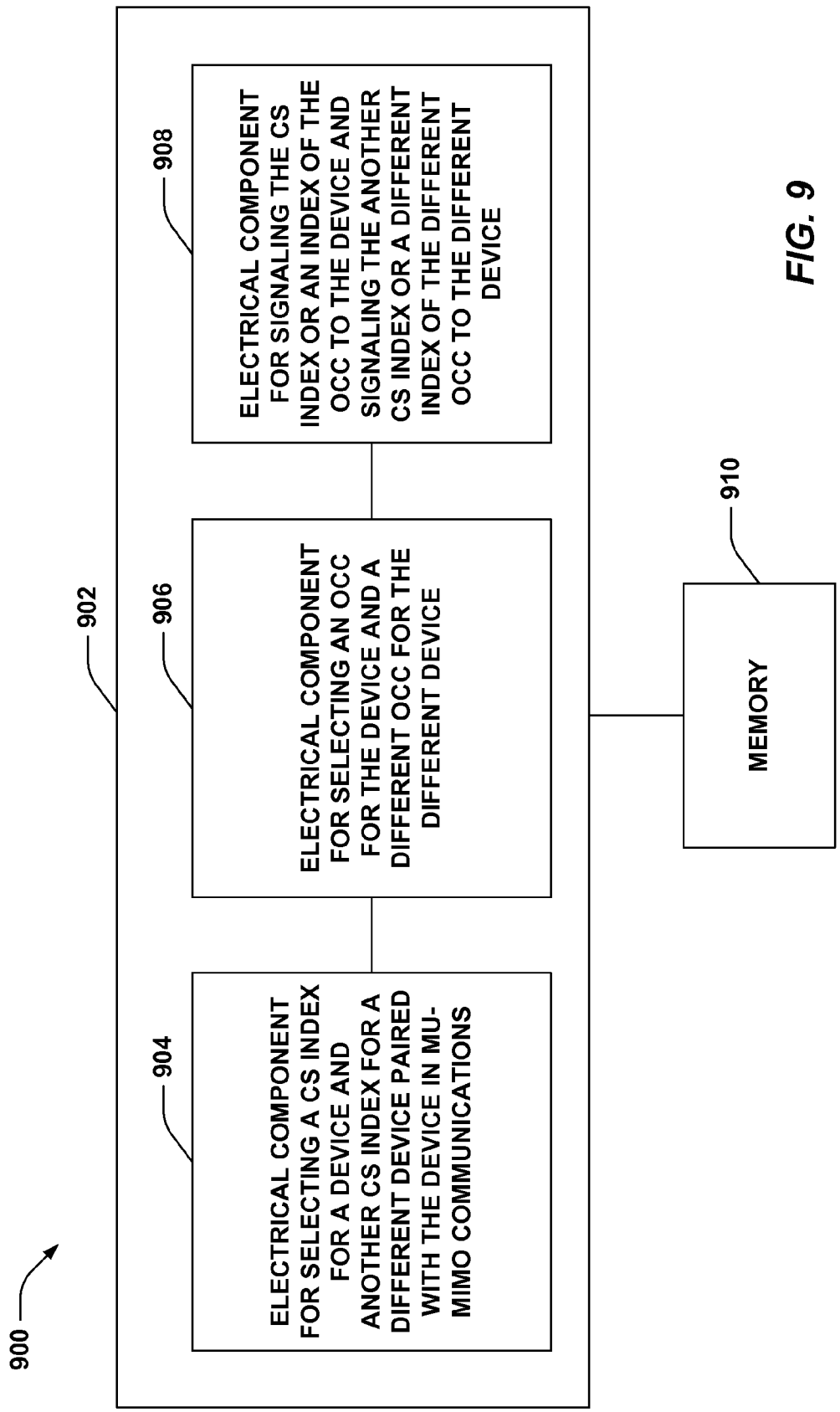
FIG. 9 illustrates an example system for signaling CS indices and/or OCC to maintain orthogonality in MU-MIMO.

With reference to FIG. 9, illustrated is a system 900 that signals CS indices and/or OCC to devices in MU-MIMO communications. For example, system 900 can reside at least partially within a base station, mobile device, etc. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include an electrical component for selecting a CS index for a device and another CS index for a different device paired with the device in MU-MIMO communications 904. For example, the device and different device can have different transmission bandwidths and can still be orthogonal by using different CS indices for the devices. Moreover, logical grouping 902 can include an electrical component for selecting an OCC for the device and a difference OCC for the different device 906.

For example, where similar CS indices are assigned for the device and different device, using different OCCs for the devices can maintain orthogonality. Further, logical grouping 902 can comprise an electrical component for signaling the CS index or an index of the OCC to the device and signaling the another CS index or a different index of the different OCC to the difference device 908. In an example, electrical component 908 can transmit the CS index, OCC, another CS index, and/or different OCC in DCI to the device and different device. For example, in an aspect, electrical component 904 can include a CS selecting component 308, and electrical component 906 can include an OCC selecting component 310. In addition, for example, electrical component 908, in an aspect, can include a DCI signaling component 312, as described above. Additionally, system 900 can include a memory 910 that retains instructions for executing functions associated with the electrical components 904, 906, and 908. While shown as being external to memory 910, it is to be understood that one or more of the electrical components 904, 906, and 908 can exist within memory 910.

In one example, electrical components 904, 906, and 908 can comprise at least one processor, or each electrical component 904, 906, and 908 can be a corresponding module of at least one processor. Moreover, in an additional or alternative example, electrical components 904, 906, and 908 can be a computer program product comprising a computer readable medium, where each electrical component 904, 906, and 908 can be corresponding instructions and/or code.

Figure 10:
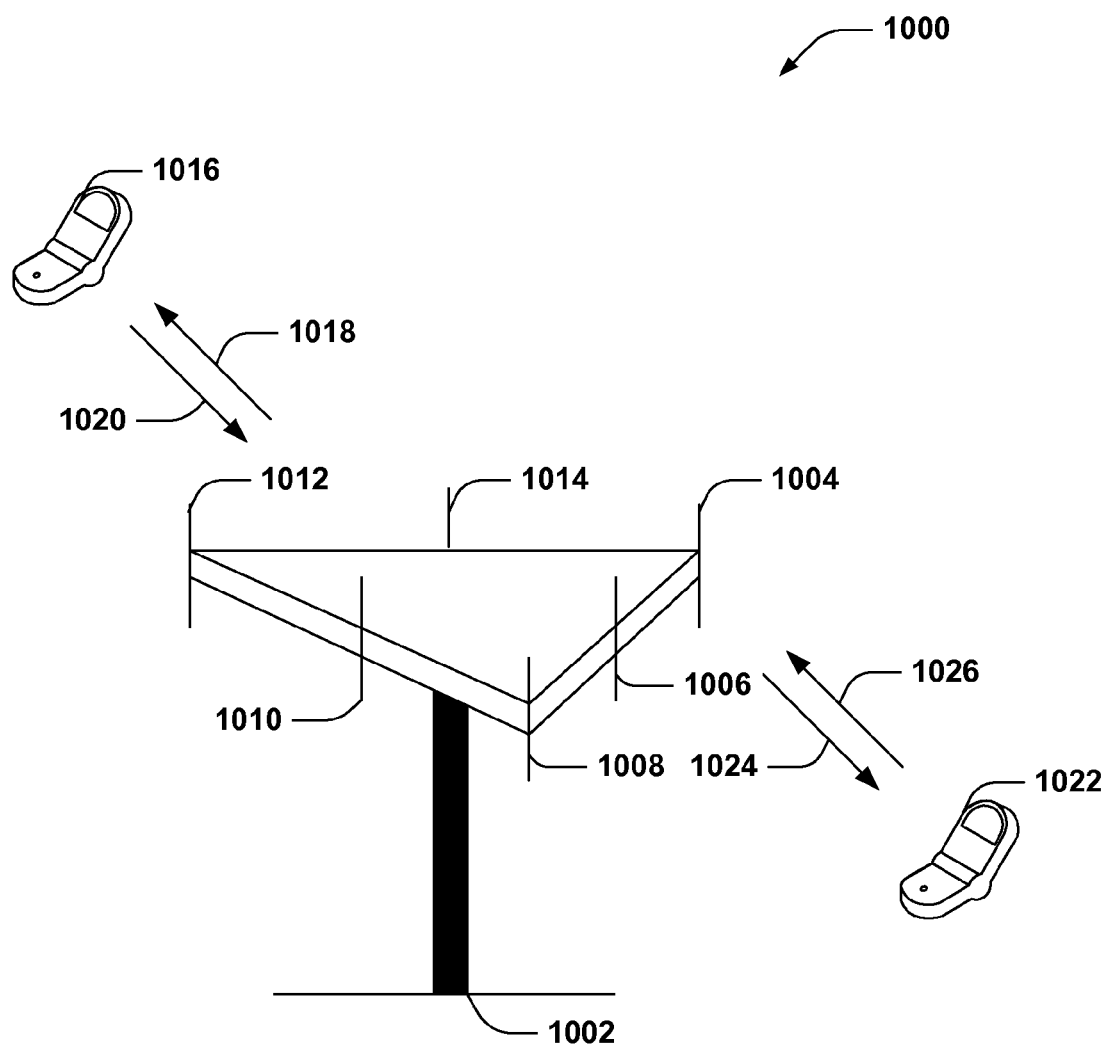
FIG. 10 illustrates an example wireless communication system in accordance with various aspects set forth herein.

Referring now to FIG. 10, a wireless communication system 1000 is illustrated in accordance with various embodiments presented herein. System 1000 comprises a base station 1002 that can include multiple antenna groups. For example, one antenna group can include antennas 1004 and 1006, another group can comprise antennas 1008 and 1010, and an additional group can include antennas 1012 and 1014. Two antennas are illustrated for each antenna group; however, more or fewer antennas can be utilized for each group. Base station 1002 can additionally include a transmitter chain and a receiver chain, each of which can in turn comprise a plurality of components associated with signal transmission and reception (e.g., processors, modulators, multiplexers, demodulators, demultiplexers, antennas, etc.), as is appreciated.

Base station 1002 can communicate with one or more mobile devices such as mobile device 1016 and mobile device 1022; however, it is to be appreciated that base station 1002 can communicate with substantially any number of mobile devices similar to mobile devices 1016 and 1022. Mobile devices 1016 and 1022 can be, for example, cellular phones, smart phones, laptops, handheld communication devices, handheld computing devices, satellite radios, global positioning systems, PDAs, and/or any other suitable device for communicating over wireless communication system 1000. As depicted, mobile device 1016 is in communication with antennas 1012 and 1014, where antennas 1012 and 1014 transmit information to mobile device 1016 over a forward link 1018 and receive information from mobile device 1016 over a reverse link 1020. Moreover, mobile device 1022 is in communication with antennas 1004 and 1006, where antennas 1004 and 1006 transmit information to mobile device 1022 over a forward link 1024 and receive information from mobile device 1022 over a reverse link 1026. In a frequency division duplex (FDD) system, forward link 1018 can utilize a different frequency band than that used by reverse link 1020, and forward link 1024 can employ a different frequency band than that employed by reverse link 1026, for example. Further, in a time division duplex (TDD) system, forward link 1018 and reverse link 1020 can utilize a common frequency band and forward link 1024 and reverse link 1026 can utilize a common frequency band.

Each group of antennas and/or the area in which they are designated to communicate can be referred to as a sector of base station 1002. For example, antenna groups can be designed to communicate to mobile devices in a sector of the areas covered by base station 1002. In communication over forward links 1018 and 1024, the transmitting antennas of base station 1002 can utilize beamforming to improve signal-to-noise ratio of forward links 1018 and 1024 for mobile devices 1016 and 1022. Also, while base station 1002 utilizes beamforming to transmit to mobile devices 1016 and 1022 scattered randomly through an associated coverage, mobile devices in neighboring cells can be subject to less interference as compared to a base station transmitting through a single antenna to all its mobile devices. Moreover, mobile devices 1016 and 1022 can communicate directly with one another using a peer-to-peer or ad hoc technology as depicted. According to an example, system 1000 can be a multiple-input multiple-output (MIMO) communication system.

Figure 11:
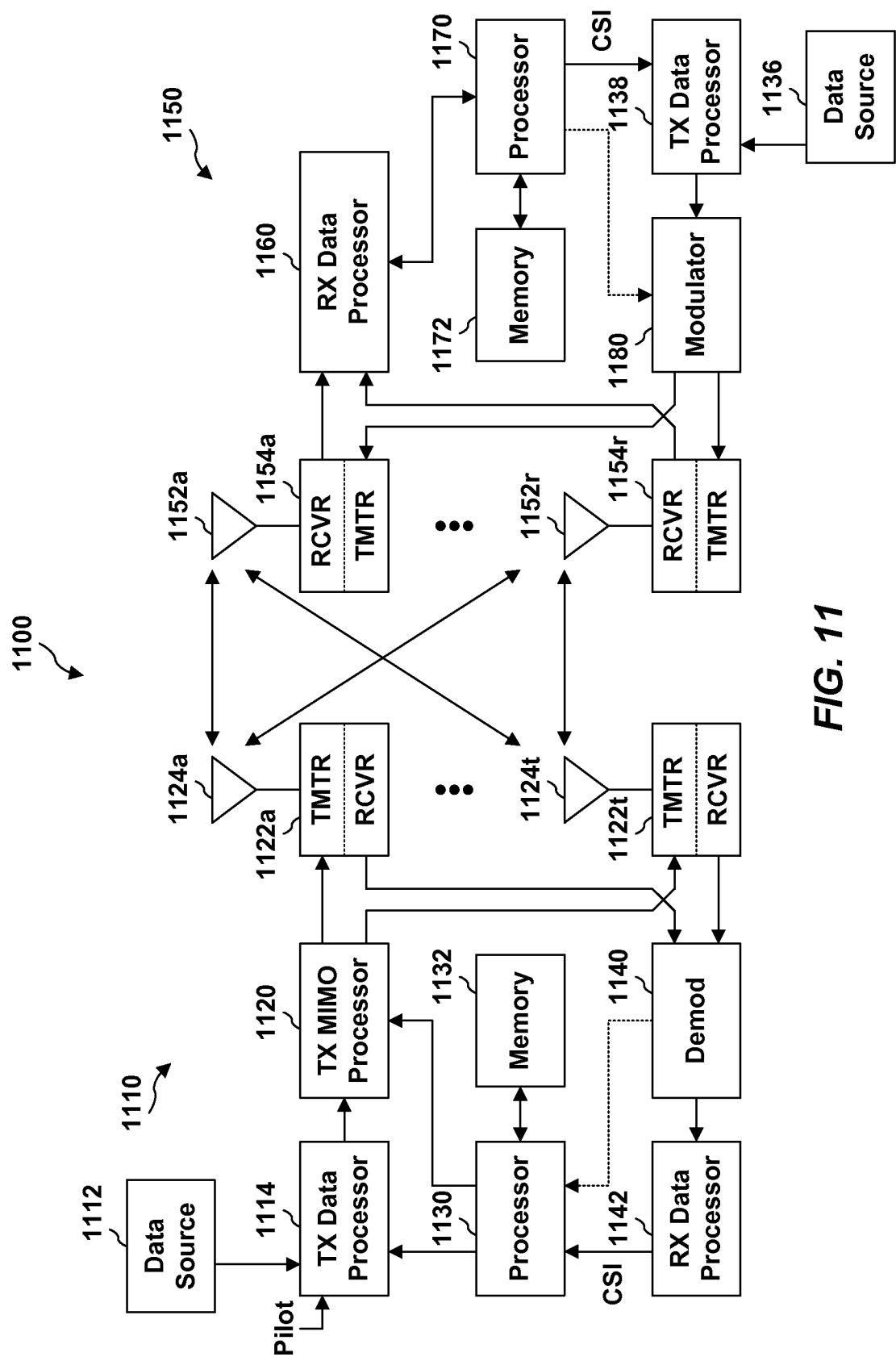
FIG. 11 illustrates an example wireless network environment that can be employed in conjunction with the various systems and methods described herein.

FIG. 11 shows an example wireless communication system 1100. The wireless communication system 1100 depicts one base station 1110 and one mobile device 1150 for sake of brevity. However, it is to be appreciated that system 1100 can include more than one base station and/or more than one mobile device, wherein additional base stations and/or mobile devices can be substantially similar or different from example base station 1110 and mobile device 1150 described below. In addition, it is to be appreciated that base station 1110 and/or mobile device 1150 can employ the systems (FIGS. 1-3 and 7-10), mobile devices, (FIG. 6), and/or methods (FIGS. 4-5) described herein to facilitate wireless communication there between. For example, components or functions of the systems and/or methods described herein can be part of a memory 1132 and/or 1172 or processors 1130 and/or 1170 described below, and/or can be executed by processors 1130 and/or 1170 to perform the disclosed functions.

At base station 1110, traffic data for a number of data streams is provided from a data source 1112 to a transmit (TX) data processor 1114. According to an example, each data stream can be transmitted over a respective antenna. TX data processor 1114 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1150 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1130.

The modulation symbols for the data streams can be provided to a TX MIMO processor 1120, which can further process the modulation symbols (e.g., for OFDM). TX MIMO processor 1120 then provides NT modulation symbol streams to NT transmitters (TMTR) 1122a through 1122t. In various embodiments, TX MIMO processor 1120 applies beamforming weights to the symbols of the data streams and to the antenna from which the symbol is being transmitted.

Each transmitter 1122 receives and processes a respective symbol stream to provide one or more analog signals, and further conditions (e.g., amplifies, filters, and upconverts) the analog signals to provide a modulated signal suitable for transmission over the MIMO channel. Further, NT modulated signals from transmitters 1122a through 1122t are transmitted from NT antennas 1124a through 1124t, respectively.

At mobile device 1150, the transmitted modulated signals are received by NR antennas 1152a through 1152r and the received signal from each antenna 1152 is provided to a respective receiver (RCVR) 1154a through 1154r. Each receiver 1154 conditions (e.g., filters, amplifies, and downconverts) a respective signal, digitizes the conditioned signal to provide samples, and further processes the samples to provide a corresponding "received" symbol stream.

An RX data processor 1160 can receive and process the NR received symbol streams from NR receivers 1154 based on a particular receiver processing technique to provide NT "detected" symbol streams. RX data processor 1160 can demodulate, deinterleave, and decode each detected symbol stream to recover the traffic data for the data stream. The processing by RX data processor 1160 is complementary to that performed by TX MIMO processor 1120 and TX data processor 1114 at base station 1110.

The reverse link message can comprise various types of information regarding the communication link and/or the received data stream. The reverse link message can be processed by a TX data processor 1138, which also receives traffic data for a number of data streams from a data source 1136, modulated by a modulator 1180, conditioned by transmitters 1154a through 1154r, and transmitted back to base station 1110.

At base station 1110, the modulated signals from mobile device 1150 are received by antennas 1124, conditioned by receivers 1122, demodulated by a demodulator 1140, and processed by a RX data processor 1142 to extract the reverse link message transmitted by mobile device 1150. Further, processor 1130 can process the extracted message to determine which precoding matrix to use for determining the beamforming weights.

Processors 1130 and 1170 can direct (e.g., control, coordinate, manage, etc.) operation at base station 1110 and mobile device 1150, respectively. Respective processors 1130 and 1170 can be associated with memory 1132 and 1172 that store program instructions/codes and data. Processors 1130 and 1170 can also perform computations to derive frequency and impulse response estimates for the uplink and downlink, respectively.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for multiplexing demodulation reference signals (DM-RS) in multiuser multiple-input multiple-output (MU-MIMO) communications, comprising:
   receiving a cyclic shift (CS) index for transmitting DM-RSs over a plurality of layers;
   determining a CS value and an orthogonal cover code (OCC) for transmitting each of the DM-RSs based at least in part on the CS index, wherein the determining the CS value is based at least in part on a pre-defined rule corresponding to the CS index and an index for each of the plurality of layers; and
   transmitting the DM-RSs according to the CS value and the OCC.

2. The method of claim 1, further comprising receiving a configured CS value, wherein the determining the OCC is further based at least in part on the configured CS value.

3. The method of claim 1, wherein the determining the OCC includes determining a different OCC for at least one of the DM-RSs over at least one of the plurality of layers.

4. The method of claim 1, wherein the determining the OCC includes determining a same OCC for at least two of the DM-RSs over at least two layers of the plurality of layers.

5. An apparatus for multiplexing demodulation reference signals (DM-RS) in multiuser multiple-input multiple-output (MU-MIMO) communications, comprising:
   at least one processor; and
   a memory coupled to the at least one processor and having instructions executable by the at least one processor to:
     obtain a cyclic shift (CS) index for transmitting DM-RSs over a plurality of layers;
     determine a CS value and an orthogonal cover code (OCC) for transmitting each of the DM-RSs based at least in part on the CS index, wherein the CS value is further determined based at least in part on a pre-defined rule corresponding to the CS index and an index for each of the plurality of layers; and
     transmit the DM-RSs according to the CS value and the OCC.

6. The apparatus of claim 5, wherein the memory further includes instructions executable by the at least one processor to obtain a configured CS value, and wherein the OCC is further determined based at least in part on the configured CS value.

7. The apparatus of claim 5, wherein the instructions executable by the at least one processor to determine the OCC include instructions executable by the at least one processor to determine a different OCC for at least one of the DM-RSs over at least one of the plurality of layers.

8. The apparatus of claim 5, wherein the instructions executable by the at least one processor to determine the OCC include instructions executable by the at least one processor to determine a same OCC for at least one of the DM-RSs over at least one of the plurality of layers.

9. An apparatus for multiplexing demodulation reference signals (DM-RS) in multiuser multiple-input multiple-output (MU-MIMO) communications, comprising:
   means for receiving a cyclic shift (CS) index for transmitting DM-RSs over a plurality of layers;
   means for determining a CS value for transmitting each of the DM-RSs based at least in part on the CS index, wherein the means for determining the CS value derives the CS value for transmitting each of the DM-RSs based at least in part on a pre-defined rule corresponding to the CS index and an index for each of the plurality of layers;
   means for determining an orthogonal cover code (OCC) for transmitting each of the DM-RSs based at least in part on the CS index; and
   means for transmitting the DM-RSs according to the CS value and the OCC.

10. The apparatus of claim 9, further comprising means for obtaining a configured CS value, and wherein the means for determining the OCC determines the OCC based further at least in part on the configured CS value.

11. The apparatus of claim 9, wherein the means for determining the OCC determines a different OCC for at least one of the DM-RSs for at least one of the plurality of layers.

12. The apparatus of claim 9, wherein the means for determining the OCC determines a same OCC for at least two of the DM-RSs over at least two layers of the plurality of layers.

13. A non-transitory computer-readable storage medium for multiplexing demodulation reference signals (DM-RS) in multiuser multiple-input multiple-output (MU-MIMO) communications, comprising:
   instructions for causing at least one computer to obtain a cyclic shift (CS) index for transmitting DM-RSs over a plurality of layers;
   instructions for causing the at least one computer to determine a CS value and an orthogonal cover code (OCC) for transmitting each of the DM-RSs based at least in part on the CS index, wherein the instructions for causing the computer to determine the CS value and the OCC further determines the CS value based at least in part on a pre-defined rule corresponding to the CS index and an index for each of the plurality of layers; and
   instructions for causing the at least one computer to transmit the DM-RSs according to the CS value and the OCC.

14. The non-transitory computer-readable storage medium of claim 13, further comprising instructions for causing the at least one computer to obtain a configured CS value, and wherein the instructions for causing the at least one computer to determine the CS value and the OCC further determines the OCC based at least in part on the configured CS value.

15. The non-transitory computer-readable storage medium of claim 13, wherein the instructions for causing the at least one computer to determine the CS value and the OCC further determines the OCC at least in part by determining a different OCC for at least one of the DM-RSs over at least one of the plurality of layers.

16. The non-transitory computer-readable storage medium of claim 13, wherein the instructions for causing the at least one computer to determine the CS value and the OCC further determines the OCC at least in part by determining a same OCC for at least two of the DM-RSs over at least two layers of the plurality of layers.

17. A method for multiuser multiple-input multiple-output (MU-MIMO) communications, comprising:
   transmitting a cyclic shift (CS) index for demodulation reference signals (DM-RSs); and
   receiving the DM-RSs over a plurality of layers in the MIMO communications, each of the DM-RSs being associated with a CS value and an orthogonal cover code (OCC), the CS value and the OCC being based at least in part on a pre-defined rule corresponding to the CS index and an index for each of the plurality of layers.

18. The method of claim 17, further comprising transmitting a configured CS value, and wherein the OCC is further based at least in part on the configured CS value.

19. An apparatus for multiuser multiple-input multiple-output (MU-MIMO) communications, comprising:
   means for transmitting a cyclic shift (CS) index for demodulation reference signals (DM-RSs); and
   means for receiving the DM-RSs over a plurality of layers in the MIMO communications, each of the DM-RSs being associated with a CS value and an orthogonal cover code (OCC), the CS value and the OCC being based at least in part on a pre-defined rule corresponding to the CS index and an index for each of the plurality of layers.

20. The apparatus of claim 19, further comprising means for transmitting a configured CS value, and wherein the OCC is further based at least in part on the configured CS value.

21. A non-transitory computer-readable storage medium for multiuser multiple-input multiple-output (MU-MIMO) communications, comprising:
   instructions for causing at least one computer to transmit a cyclic shift (CS) index for demodulation reference signals (DM-RSs); and
   instructions for causing the at least one computer to receive the DM-RSs over a plurality of layers in the MIMO communications, each of the DM-RSs being associated with a CS value and an orthogonal cover code (OCC), the CS value and the OCC being based at least in part on a pre-defined rule corresponding to the CS index and an index for each of the plurality of layers.

22. The non-transitory computer-readable storage medium of claim 21, further comprising instructions for causing the at least one computer to transmit a configured CS value, and wherein the OCC is further based at least in part on the configured CS value.

23. A method for provisioning cyclic shift (CS) indices and orthogonal cover codes (OCC) to devices in multiuser multiple-input multiple-output (MU-MIMO) communications, comprising:
   selecting a first CS index and a first OCC for a first device;
   selecting a second CS index and a second OCC for a second device paired with the first device in MU-MIMO communications;
   signaling the first CS index to the first device, wherein the first device is configured to receive the first CS index for transmitting demodulation reference signals (DM-RSs) over a plurality of layers, and to determine a first CS value and the first OCC for transmitting each of the DM-RSs based at least in part on a pre-defined rule corresponding to the first CS index and an index for each of the plurality of layers, wherein the first device is configured to determine the first OCC by determining a same OCC for at least two of the DM-RSs over at least two layers of the plurality of layers; and
   signaling the second CS index to the second device, wherein the second device is configured to receive the second CS index for transmitting DM-RSs over the plurality of layers, and to determine a second CS value and the second OCC for transmitting each of the DM-RSs based at least in part on a pre-defined rule corresponding to the second CS index and the idex for each of the plurality of layers.

24. The method of claim 23, wherein the first and second devices have different transmission bandwidths.

25. An apparatus for provisioning cyclic shift (CS) indices or orthogonal cover codes (OCC) to devices in multiuser multiple-input multiple-output (MU-MIMO) communications, comprising:
   at least one processor; and
   a memory coupled to the at least one processor and having instructions executable by the at least one processor to:
      determine a first CS index and a first OCC for a first device;
      determine a second CS index and a second OCC for a second device paired with the first device in MU-MIMO communications;
      transmit the first CS index to the first device, wherein the first device is configured to receive the first CS index for transmitting demodulation reference signals (DM-RSs) over a plurality of layers, and to determine a first CS value and the first OCC for transmitting each of the DM-RSs based at least in part on a pre-defined rule corresponding to the first CS index and an index for each of the plurality of layers, wherein the first device is configured to determine the first OCC by determining a same OCC for at least two of the DM-RSs over at least two layers of the plurality of layers; and
      transmit the second CS index to the second device, wherein the second device is configured to receive the second CS index for transmitting DM-RSs over the plurality of layers, and to determine a second CS value and the second OCC for transmitting each of the DM-RSs based at least in part on a pre-defined rule corresponding to the second CS index and the index for each of the plurality of layers.

26. An apparatus for provisioning cyclic shift (CS) indices or orthogonal cover codes (OCC) to devices in multiuser multiple-input multiple-output (MU-MIMO) communications, comprising:
   means for selecting a first CS index for a first device and a second CS index for a second device paired with the first device in MU-MIMO communications;
   means for selecting a first OCC for the first device and a second OCC for the second device; and
   means for signaling the first CS index to the first device and signaling the second CS index to the second device,
   wherein the first device is configured to receive the first CS index for transmitting demodulation reference signals (DM-RSs) over a plurality of layers, to determine a first CS value and the first OCC for transmitting each of the DM-RSs based at least in part on a pre-defined rule corresponding to the first CS index and an index for each of the plurality of layers, and to determine the first OCC by determining a same OCC for at least two of the DM-RSs over at least two layers of the plurality of layers, and
   wherein the second device is configured to receive the second CS index for transmitting DM-RSs over the plurality of layers, and to determine a second CS value and the second OCC for transmitting each of the DM-RSs based at least in part on a pre-defined rule corresponding to the second CS index and the index for each of the plurality of layers.

27. The apparatus of claim 26, wherein the first and second devices have different transmission bandwidths.

28. A non-transitory computer-readable storage medium for provisioning cyclic shift (CS) indices or orthogonal cover codes (OCC) to devices in multiuser multiple-input multiple-output (MU-MIMO) communications, comprising:

instructions for causing at least one computer to determine a first CS index and a first OCC for a first device and a second CS index and a second OCC for a second device paired with the first device in MU-MIMO communications;

instructions for causing the at least one computer to transmit the first CS index to the first device, wherein the first device is configured to receive the first CS index for transmitting demodulation reference signals (DM-RSs) over a plurality of layers, to determine a first CS value and the first OCC for transmitting each of the DM-RSs based at least in part on a pre-defined rule corresponding to the first CS index and an index for each of the plurality of layers, and to determine the first OCC by determining a same OCC for at least two of the DM-RSs over at least two layers of the plurality of layers; and instructions for causing the at least one computer to transmit the second CS index to the second device, wherein the second device is configured to receive the second CS index for transmitting DM-RSs over the plurality of layers, and to determine a second CS value and the second OCC for transmitting each of the DM-RSs based at least in part on a pre-defined rule corresponding to the second CS index and the index for each of the plurality of layers.

* * * * *